United States Patent Office 3,703,529
Patented Nov. 21, 1972

3,703,529
NITROGEN-CONTAINING TRICYCLIC
COMPOUNDS
John Frederick Cavalla, Isleworth, Roy Simpson, Slough, and Alan Chapman White, Windsor, England, assignors to John Wyeth & Brother Limited, Taplow, Maidenhead, England
No Drawing. Filed Mar. 26, 1970, Ser. No. 23,055
Claims priority, application Great Britain, Mar. 31, 1969, 16,670/69
Int. Cl. C07d 27/30
U.S. Cl. 260—326.5 B    10 Claims

ABSTRACT OF THE DISCLOSURE

A new group of substituted indeno-[2,1-b]pyrroles useful as analgesic or anti-inflammatory agents is described. These compounds are optionally substituted at the 3a-position by lower alkyl radicals, optionally substituted at the 1-position by lower alkyl, lower alkenyl, lower alkynyl, aryl lower alkyl, cycloalkyl lower alkyl, tertiary amino lower alkyl or acyl radicals, optionally substituted at the 4-, 5-, 6- or 7-positions by lower alkoxy or hydroxyl radicals, optionally substituted at the 2-position by an oxygen atom and optionally substituted at the 8-position by an oxygen atom, or a hydroxyl or acyloxy radical.

This invention relates to novel nitrogen-containing tricyclic compounds, to processes for the preparation thereof and to pharmaceutical compositions containing such nitrogen containing tricyclic compounds.

The present invention provides nitrogen-containing tricyclic compounds of the general formula:

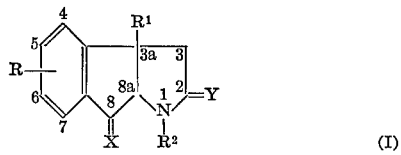

(I)

and acid addition and quaternary ammonium salts thereof in which R is a hydrogen atom, or a lower alkyl, lower alkoxy, aryl lower alkoxy, acyloxy or hydroxyl radical; $R^1$ represents a hydrogen atom or a lower alkyl or aryl lower alkyl group; $R^2$ represents a hydrogen atom or a lower alkyl, lower alkenyl, lower alkynyl, aryl lower alkyl, cycloalkyl, cycloalkyl lower alkyl, tertiary amino lower alkyl or an acyl residue; Y represents two hydrogen atoms or an oxygen atom and X represents two hydrogen atoms, or an oxygen atom or one hydrogen atom and one radical chosen from hydroxyl, lower alkoxy, aryl lower alkoxy, aryloxy or acyloxy radicals. The term "lower" as used herein means the radical contains up to 6, preferably 1–4 carbon atoms. The ring system of the compounds of the invention is numbered as shown in general Formula I.

In addition, because of the presence of two or more asymmetric carbon atoms, optical enantiomorphs are possible and the compounds of the invention may be either of the pure enantiomorphs or mixtures of such enantiomorphs. Such enantiomorphs can be obtained by resolving them or any convenient intermediate in their synthesis by known methods.

One preferred group of compounds are those where R is a hydrogen atom, but it may also be a lower alkoxy (for example a methoxy radical) or hydroxyl radical, particularly where this lower alkoxy or hydroxyl radical is at the 5-position. Preferably $R^1$ is a methyl radical but it may also be a hydrogen atom. The preferred group of compounds are also those in which $R^2$ is a hydrogen atom or a lower alkyl group (for example a methyl radical), but it may also be a cyclopropylmethyl, phenylethyl, acetyl or allyl radical. The group X is preferably a hydrogen atom and a hydroxyl radical but may also be two hydrogen atoms.

The compounds of the general Formula I

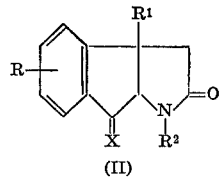    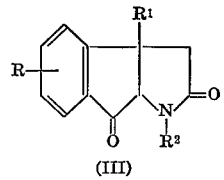

(II)           (III)

in which Y is two hydrogen atoms and R, $R^1$, $R^2$, and X have the meanings already defined, with the proviso that X is not an oxygen atom, can be prepared by reduction with a hydride transfer reagent, particularly a metal hydride, of compounds of the general Formulae II and III in which X, R, $R^1$ and $R^2$ have the meanings originally defined. When the reduction product is not the final required compound it may optionally be subjected to other known reactions such as alkylation, acylation, reduction or hydrolysis to give the desired compound. By this is meant that one or more of the groups R, $R^2$ and X in the reduction product may be converted by known methods into another group R, $R^2$ and X respectively, each within its own meanings defined above.

In one preferred series, compounds of the general Formulae II and III in which R is a hydrogen atom or methoxy group at the 5-position, $R^1$ is a methyl radical, $R^2$ is a hydrogen atom and X is two hydrogen atoms, are reduced with aluminum lithium hydride to give compounds of the general Formula I in which R is a hydrogen atom or a methoxy group at the 5-position, $R^1$ is a methyl radical, $R^2$ is a hydrogen atom, X is one hydrogen atom and one hydroxyl group, or two hydrogen atoms, and Y is two hydrogen atoms. The product may (a) be alkylated (i) by treatment with, for example, an alkenyl halide (particularly allyl bromide) in the presence of an acid acceptor, for example, potassium carbonate, or (ii) by reductive methylation, or (b) acylated by treatment with, for example, an acyl halide (particularly phenylacetyl chloride or cyclopropane carboxylic acid chloride) in the presence of an acid acceptor, for example, triethylamine, and the acylated product optionally reduced. In those products where R is a methoxy group, this may be hydrolysed by methods known in the art to give compounds where R is a hydroxyl group. When the product is a secondary amine this may be converted into an acid addition salt by treatment with a pharmaceutically acceptable acid, for example, hydrochloric acid, p-toluenesulphonic acid or fumaric acid, while tertiary amine products may be treated similarly or converted into quaternary ammonium salts by treatment with an alkyl-halide, for example, methyl iodide.

The compounds of the general Formulae II and III in which R, R¹, and X have the meanings already defined and R² is an acyl residue may be prepared by reacting the alkali metal derivatives of compounds of general Formulae II and III in which R, R¹, and X have the meanings already defined in R² is a hydrogen atom, with an acyl halide.

One preferred class of compounds are those of general Formula II in which R is a hydrogen atom or a methoxy group at the 5-position, R¹ is a methyl radical, X is two hydrogen atoms and R² is an acyl residue, particularly phenylacetyl or cyclopropylcarbonyl, which may be prepared by treating the alkali metal derivative (preferably the sodio derivative) of a compound of general Formula II in which R is a hydrogen atom or a methoxy group at the 5-position, R¹ is a methyl radical, R² is a hydrogen atom and X is two hydrogen atoms, with an acyl halide, preferably phenylacetyl chloride or cyclopropyl carboxylic acid chloride.

The compounds of the general Formula II in which R, R¹ and X have the previously defined meanings and R² is a lower alkyl, lower alkenyl, lower alkynyl, aralkyl, cycloalkyl, cycloakyl lower alkyl or tertiary amino lower alkyl residue, may be prepared by reacting the alkali metal derivative of a compound of general Formula II in which R and R¹, have the meanings already defined, R² is a hydrogen atom and X is other than an oxygen atom with, for example, an alkyl halide.

A preferred series of compounds are those of general Formula II wherein R is a hydrogen atom, R¹ is a methyl radical, X is two hydrogen atoms and R² is an alkyl radical, particularly a 3-dimethylaminopropyl or methyl radical, which may be prepared by treating the alkali metal derivative (preferably the sodio derivative) of a compound of general Formula II in which R is a hydrogen atom, R¹ is a methyl radical, X is two hydrogen atoms and R² is a hydrogen atom with preferably 3-dimethylaminopropyl chloride or methyl iodide.

The compounds of the general Formula II in which R and R¹ have the meanings already defined, R² is a hydrogen atom or a lower alkyl, aralkyl (except arylmethyl), cycloalkyl, cycloalkyl lower alkyl, or a tertiary amino lower alkyl residue, and X is two hydrogen atoms, can be prepared by catalytic hydrogenation of compounds of general Formula III in which R and R¹ have the meanings previously described, and R² is a hydrogen atom or a lower alkyl, aralkyl (except arylmethyl) cycloalkyl, cycloalkyl lower alkyl, or a tertiary amino lower alkyl residue, allowing two molecular equivalents of hydrogen to be absorbed. If the hydrogenation is stopped when only one molecular equivalent of hydrogen has been absorbed, there are obtained compounds of the general Formula II in which R and R¹ have the meanings already defined, R² is a hydrogen atom or a lower alkyl, aralkyl (except arylmethyl), cycloalkyl, cycloalkyl lower alkyl, or a tertiary amino lower alkyl residue, and X is one hydrogen atom and one hydroxyl group.

A preferred series of compounds of general Formula III in which R and R² are hydrogen atoms, R¹ is a methyl radical and X is two hydrogen atoms may be prepared by hydrogenating (allowing two molecular equivalents of hydrogen to be absorbed) in the presence of a catalyst such as Raney nickel, palladium or platinum oxide, a solution (preferably in an alcohol or alkanoic acid) of a compound of the Formula II in which R and R² are hydrogen atoms and R¹ is a methyl radical.

In the compounds of the general Formula III in which R, R¹, and R² have the meanings previously described, the ketonic-carbonyl group at the 8-position may also be reduced by methods known in the art for reducing such a functional group. Examples of such methods are (a) zinc and hydrochloric acid (b) tin and hydrochloric acid, (c) sodium amalgam, (d) sodium borohydride or other hydrides which are known not to reduce the amidocarbonyl function, (e) Clemmensen reduction, (f) Wolff-Kishner and (g) the Meerwein-Pondorf-Verley reduction.

A preferred method of preparation of compounds of the general Formula IV(d) in which R and R¹ have the meanings already defined, is given below:

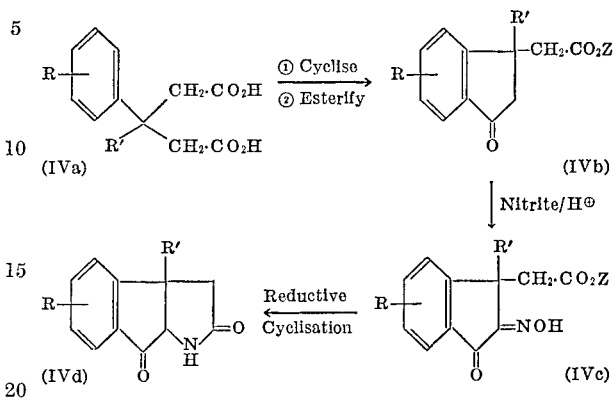

As can be seen a compound of general Formula IV(a), which may be prepared by methods known in the art, is treated with an acidic cyclising agent such as polyphosphoric acid to give an indanone acetic acid which is esterified particularly under Fischer-Speier conditions using an alcohol of the formula ZOH, wherein Z is a lower alkyl residue, to give the ester IV(b). Treatment of this compound with a nitrite (for example, n-pentyl nitrite) and hydrogen chloride affords the hydroxyimino compounds of general Formula IV(c). Subsequent hydrogenation in an acetic acid or alcohol solution over a catalyst (for example, palladium, nickel, or platinum oxide) yields the compounds of general Formula IV(d).

Although the compounds of general Formula IV(d) are the products usually isolated from this reduction, it has been shown that the reaction proceeds through an intermediate compound of the Formula IV(c) in which the 2-hydroxyimino residue has been reduced to a 2-amino residue. By carrying out the reduction in the presence of acetic anhydride, the acetyl derivative of the 2-amino compound can be isolated. The reduction of compounds of the general Formula IV(c) can also be brought about by methods other than catalytic hydrogenation, for example (a) zinc and acetic acid, or (b) tin and hydrochloric acid, or (c) sodium amalgam and acetic acid, or (d) aluminium amalgam, or (e) electrolytic reduction.

The invention also provides a pharmaceutical composition which comprises a compound of general Formula I, or an acid addition or quaternary ammonium salt thereof, and a pharmaceutically acceptable carrier. The carrier can be solid, liquid or cream-like and any suitable carrier known in the art can be used. The composition may be in the form of a tablet, capsule or solution.

The new and novel compounds of the present invention possess valuable pharmacological activity, in particular, they demonstrate an ability to reduce pain and so may be useful as analgesics. In addition some of the compounds demonstrate anti-inflammatory activity. Furthermore the compounds can also be used as intermediates for the preparation of similar compounds.

In the pharmacological evaluation of the analgesic properties of the compounds of this invention the effects in vivo of the compounds are tested on mice by the Haffner tail clip method (see F. Haffner, Deutsch. Med. Wschr. 55, 731 (1929) or by the radiant heat on tail method of D'Amour-Smith (J. Pharmacol, 72, 74 (1941)).

The compounds of this invention in the above test procedures when administered subcutaneously at a dosage of about 10 to about 200 mg./kg. demonstrated analgesic activity.

In the pharmacological evaluation of the anti-inflammatory properties of the compounds of this invention, the effect in vivo of the compounds are tested by the procedures of Winter et al. in Proc. Soc. Biol. Med., 111, 544 (1962) and Buttle et al. in Nature, 179, 629 (1957).

The compounds of this invention in the above test procedures when administered orally and/or parenterally at a dosage of about 10 to about 200 mg./kg. demonstrated anti-inflammatory activity. Further details concerning the utility of the compounds of this invention are given hereinafter in the examples.

When the compounds of this invention are employed as analgesic or anti-inflammatory agents they may be administered to warm-blooded animals e.g. mice, rats, rabbits, dogs, cats or monkeys alone or in combination with pharmacologically acceptable carriers, the proportion of which is determined by the solubility and chemical nature of the compounds, chosen route of administration and standard biological practice. For example, they may be administered orally in the form containing such excipients as for example starch, milk or sugar. They may also be administered orally in the form of solutions or they may be injected parenterally. For parenteral administration they may be used in the form of a sterile solution or suspension containing other solutes, for example enough saline or glucose to make the solution isotonic. Conveniently they are administered in unit dosage form.

The dosage of the present agents will vary with the form of administration and the particular compound chosen. Furthermore, it will vary with the particular subject under treatment. Generally, treatment is initiated with small dosage substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following non-limiting examples illustrate the invention:

EXAMPLE 1

3a,8a-dihydro-3a-methylindeno[2,1-b]pyrrol-2,8-(1H,3H)-dione (a) 3-methyl-3-phenylglutaric acid (65.0 g.) was stirred vigorously with polyphosphoric acid (600 g.) at 90–100° C. After 2 hours the dark red mixture was poured into ice-water (ca. 1200 g.). Storage at 0° C. gave 1-methyl-3-oxo-indan-1-ylacetic acid (50.7 g.) as a yellow powder, M.P. 126–128° C.

Dry hydrogen chloride was passed through a solution of 1-methyl-3-oxo-indan-1-ylacetic acid (110.0 g.) in methanol (900 ml.) for 0.75 hour. The solution was then heated under reflux for 18 hours and evaporated to an orange oil. The oil was dissolved in ether and washed with 2 N sodium carbonate and water until neutral. After drying, the product was distilled affording the ester (107.3 g.) as a yellow oil, B.P. (0.2 mm.) 116–118° C. (Found: C, 70.8; H, 6.3. $C_{13}H_{14}O_3 \cdot \frac{1}{4}H_2O$ requires C, 70.45; H, 6.5%.)

(b) The ester prepared according to Example 1(a) (99.9 g.) in anhydrous ester (1200 ml.) was saturated with hydrogen chloride at 50° C. n-Pentyl nitrite (99 ml.) was added dropwise with stirring whilst maintaining the temperature of the mixture between 5–10° C. The product, a colourless solid, was filtered off after 1.0 hour to yield the oxime (112.1 g.) M.P. 181–183° C. A sample recrystallised from propan-2-ol for analysis had the same M.P. (Found: C, 63.1; H, 5.4; N, 5.7. $C_{13}H_{13}NO_4$ requires C, 63.15; H, 5.3; N, 5.7.)

(c) The oxime of Example 1(b) (12.0 g.) was hydrogenated in a mixture of glacial acetic (100 ml.) and 10% palladium on charcoal (1.5 g.) at room temperature and an initial pressure of 40 p.s.i. The theoretical quantity of hydrogen (2 molecular equivalents) was absorbed in 0.5 hour. After removal of the catalyst, evaporation gave a purple residue which was recrystallised from propan-2-ol using charcoal. The dione (7.3 g.) was obtained as colourless rhombs, M.P. 190–192° C. (Found: C, 71.5; H, 5.4; N, 7.15. $C_{12}H_{11}NO_2$ requires C, 71.6; H, 5.5; N, 7.0%.)

This compound is useful as an intermediate for the preparation of active compounds as shown in the next example.

By substituting the following glutaric acids in the above procedure the products indicated are obtained:

| Glutaric acid | Product |
|---|---|
| 3-methyl-3-(p-tolyl)glutaric acid. | 3a,8-dihydro-3a, 5-dimethyl-indeno[2,1-b]pyrrol-2,8-(1H,3H)-dione. |
| 3-methyl-3-(p-butylphenyl) glutaric acid. | 5-butyl-3a,8-dihydro-3a-methylindeno[2,1-b]pyrrol-2,8-(1H,3H)-dione. |
| 3-methyl-3-(p-butoxyphenyl) glutaric acid. | 5-butoxy-3a,8-dihydro-3a-methylindeno[2,1-b]pyrrol-2,8-(1H,3H)-dione. |
| 3-methyl-3-(p-phenoxyphenyl) glutaric acid. | 3a,8-dihydro-3a-methyl-5-phenoxy-indeno[2,1-b]pyrrol-2,8-(1H,3H)-dione. |
| 3-methyl-3-[p-(p-tolyloxy) phenyl] glutaric acid. | 3a,8-dihydro-3a-methyl-5-(p-tolyloxy)-indeno[2,1-b] pyrrol-2,8-(1H,3H)-dione. |
| 3-(n-butyl)-3-phenylglutaric acid. | 3a-(n-butyl)-3a,8-dihydorindeno-[2,1-b]pyrrol-2,8-(1H,3H)-dione. |
| 3-benzyl-3-phenylglutaric acid. | 3a-benzyl-3a,8-dihydro-indeno-[2,1-b]pyrrol-2,8-(1H,3H)-dione. |
| 3-phenethyl-3-phenylglutaric acid. | 3a,8-dihydro-3a-phenethylindeno-[2,1-b]pyrrol-2,8-(1H,3H)-dione. |
| 3-(p-methylbenzyl)-3-phenyl glutaric acid. | 3a,8-dihydro-3a-(p-methylbenzyl)-indeno[2,1-b]pyrrol-2,8-(1H,3H)-dione. |

EXAMPLE II 1,2,3,3a,8,8a-hexahydro-3-methylindeno[2,1-b]-pyrrolyl-8-ol

The dione of Example 1(c) (10.0 g.) was dissolved in dry tetrahydrofuran (350 ml.) and added dropwise to a stirred suspension of aluminum lithium hydride (12.0 g.) in dry tetrahydrofuran (150 ml.). On completion of the addition the mixture was stirred under reflux for 22 hours. Sodium hydroxide solution (5 N, 30 ml.) was added dropwise at the reflux temperature followed by water (15 ml.) to decompose the complex. The mixture was filtered and evaporated to yield a pink oil. The oil was dissolved in propan-2-ol and a solution of ethereal hydrogen chloride added to yield the title compound as its hydrochloride (8.2 g.), M.P. 174–5° C. (Found: C, 63.8; H, 7.1; N, 6.25. $C_{12}H_{15}NO \cdot HCl$ requires C, 63.8; H, 7.15; N, 6.2%.)

This compound showed definite analgesia in mice at a subcutaneous dose of 50 m.p.k., and anti-inflammatory activity in rate at an oral dose of 30 m.p.k.

EXAMPLE III 8-acetoxy-1-acetyl-1,2,3,3a,8,8a-hexahydro-3a-methylindeno[2,1-b]pyrrole A mixture of 1,2,3,3a,8,8a-hexahydro-3a-methylindeno[2,1-b]pyrrolyl-8-ol (15.21 g.), pyridine (70 ml.) and acetic anhydride (45 ml.) was heated under reflux for 2.5 hours. The excess of pyridine and acetic anhydride was removed under vacuum, water (200 ml.) added to the residue and the precipitated oil extracted into benzene (250 ml.). The organic extract was washed with saturated aqueous sodium chloride solution (100 ml.), dried (MgSO$_4$), treated with charcoal, filtered and the filtrate evaporated to give an orange coloured oil which on distillation afforded 13.96 g. of the diacetyl compound, B.P. (0.2 mm.) 147–149° C. Crystallisation of 12.0 g. of the distillate from benzene-petroleum ether (B.P. 100–120° C.) gave 10.06 g. of the diacetyl compound as white rhombs, M.P. 88.5–89.5° C. (Found: C, 70.5; H, 7.0; N, 5.1. $C_{16}H_{19}NO_3$ requires C, 70.3; H, 7.0; N, 5.1%.)

This compound is useful as an intermediate for the preparation of active compounds e.g. 1-acetyl-1,2,3,3a,8,-8a-hexahydro-3a-methylindeno[2,1-b]pyrrolyl-8-ol.

EXAMPLE IV 1-acetyl-1,2,3,3a,8,8a-hexahydro-3-methylindeno-[2,1-b]pyrrolyl-8-ol A stirred and cooled mixture of 1,2,3,3a,8,8a-hexahydro-3a-methylindeno[2,1-b]pyrrolyl-8-ol (4.95 g.), triethylamine (4.46 g.) and dry chloroform (25 ml. previously dried over 4A molecular sieve) was treated dropwise with a solution of acetyl chloride (1.73 g.) in dry chloroform (5 ml.) whilst maintaining the temperature below 5° C. After stirring the mixture at below 20° C. for 1 hour, chloroform (20 ml.) was added and the resulting mixture washed with water (150 ml.). The dried ($MgSO_4$) organic extract was evaporated to afford an orange coloured oil, which after crystallisation from ether and recrystallisation from ethyl acetate gave 1.74 g. of the title compound, M.P. 126–127° C., as colourless rhombs. (Found: C, 72.7; H, 7.4; N, 5.9. $C_{14}H_{17}NO_2$ requires C, 72.7; H, 7.4; N, 6.1%.)

This compound showed analgesia in mice at a subcutaneous dose of 50 m.p.k., and anti-inflammatory activity in rats at an oral dose of 50 m.p.k.

EXAMPLE V 1-benzoyl-1,2,3,3a,8,8a-hexahydro-3a-methylindeno-[2,1-b]pyrrolyl-8-ol The reaction was carried out according to the procedure of Example IV using 1,2,3,3a,8,8a-hexahydro-3a-methylindeno[2,1-b]pyrrolyl-8-ol (4.95 g.), triethylamine (4.46 g.) and benzoyl chloride (3.1 g., 2.56 ml.). The orange coloured oil was crystallised from carbon tetrachloride to give 5.53 g. of the benzoyl derivative as white rhombs, M.P. 115–116° C. (Found: C, 77.5; H, 6.6; N, 4.7. $C_{19}H_{19}NO_2$ requires C, 77.8; H, 6.5; N, 4.8%.)

This compound is useful as an intermediate for the preparation of other compounds of the invention.

EXAMPLE VI

Methyl 2-acetamido-1-methyl-3-oxo-1-indanylacetate

A maxiture of the hydroxyimino compound (5.0 g., 0.02 mol.) of Example 1(b), 10% palladium on charcoal (1.0 g.), acetic acid (80 ml.) and acetic anhydride (20 ml.) was hydrogenated 50 p.s.i. until the uptake of hydrogen had ceased. The catalyst was filtered off, the filtrate evaporated to dryness and the residue recrystallised from benzene to give 1.34 g. (24%) of the title compound, M.P. 151.5–152.5° C. (Found: C, 65.5; H, 6.2; N, 5.05. $C_{15}H_{17}NO_4$ requires C, 65.4; H, 6.2; N, 5.1%.)

This compound is useful as an intermediate for the preparation of other compounds of the invention.

EXAMPLES VII 1,2,3,3a,8,8a-hexahydro-1,3a-dimethylindeno-[2,1-b]pyrrolyl-8-ol 1,2,3,3a,8,8a - hexahydro - 3a - methylindeno[2,1-b]-pyrrolyl-8-ol (1.96 g.) was reduced at an initial pressure of 50 p.s.i. and temperature of 45° C. in the presence of ethanol (100 ml.), 40% aqueous formaldehyde (1.5 ml.) and 10% palladium on charcoal (0.6 g.) Uptake of hydrogen ceased after 6 hours and the catalyst was then removed. Evaporation afforded an oil which yielded the title compound as its hydrochloride on treatment with propan-2-ol and ethereal hydrogen chloride. When recrystallised from propan-2-ol/ether 1.75 g. of the hydrochloride were obtained, M.P. 196–8° C. (Found: C, 65.2; H, 7.9; N, 5.8. $C_{13}H_{17}NO \cdot HCl$ requires C, 65.2; H, 7.6; N, 5.85%.)

This compound showed analgesia in mice at a subcutaneous dose of 50 m.p.k. and anti-inflammatory activity in rats at an oral dose of 50 m.p.k.

EXAMPLE VIII 1-allyl-1,2,3,3a,8,8a-hexahydro-3a-methylindeno-[2,1-b]pyrrolyl-8-ol 1,2,3,3a,8,8a - hexahydro - 3a - methylindeno[2,1-b] pyrrolyl-8-ol hydrochloride (3.4 g.)anhydrous potassium carbonate (2.08 g.) and allyl bromide (1.82 g.) in butan-2-one (150 ml.) were heated under reflux for 24 hours. The solid material was filtered off and the butan-2-one removed affording 3.15 g. of a brown oil. The oil was dissolved in ether (30 ml.) and treated with a solution of fumaric acid (2.0 g.) dissolved in the minimum quantity of hot propan-2-one. The crystalline product was filtered and recrystallised from propan-2-one/ether to yield the title compound (2.49 g.) as the fumarate salt, M.P. 168–169°. (Found: C, 66.4; H, 6.9; N, 3.9.

$C_{15}H_{19}NO \cdot C_4H_4O_4$ requires C, 66.1; H, 6.7; N, 4.1%.)

This compound showed analgesia in mice at a subcutaneous dose of 50 m.p.k.

Following the procedure outlined above, the following alkylating agents give the products indicated:

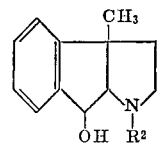

| Alkylating agent | $R^2$ group |
| --- | --- |
| 1-bromoprop-2-yne | $-CH_2-C\equiv CH$ |
| 3-dimethylaminopropyl chloride | $-(CH_2)_3NMe_2$ |
| 3-diethylaminopropyl chloride | $-(CH_2)_3NEt_2$ |
| 2-dimethylaminoethyl chloride | $-(CH_2)_2NMe_2$ |
| 2-diethylaminoethyl chloride | $-(CH_2)_2NEt_2$ |
| Cyclohexyl chloride | 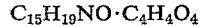 |
| Cyclopropyl bromide | |

EXAMPLE IX 3,3a,8,8a-tetrahydro-3a-methylindeno[2,1-b] pyrrol-2(1H)-one

The dione of Example 1(c) (20.1 g.) in glacial acetic acid (150 ml.) was hydrogenated at an initial pressure of 50 p.s.i. and temperature of 70° C. in the presence of 10% palladium on charcoal (6.0 g.). The theoretical quantity of hydrogen was absorbed in 3 hours. Removal of the catalyst and evaporation of the solvent afforded an oil which was dissolved in toluene (150 ml.) and re-evaporated. The oil was crystallised from propan-2-ol yielding the title compound (15.7 g.) as colourless plates, M.P. 180–182° C. (Found: C, 77.1; H, 7.2; N, 7.65. $C_{12}H_{13}NO$ requires C, 77.0; H, 7.0; N, 7.5%.)

This compound is useful as an intermediate for the preparation of active compounds as shown in the next example.

EXAMPLE X 1,2,3,3a,8,8a-hexahydro-3a-methylindeno[2,1-b] pyrrole

The product of Example IX (12.2 g.) in dry tetrahydrofuran (350 ml.) was added dropwise to a stirred suspension of aluminium lithium hydride (9.7 g.) in dry tetrahydrofuran (90 ml.). When the addition was complete the mixture was stirred and heated under reflux for 5 hours. The complex was cooled and decomposed by the addition of water (28 ml.) and the inorganic material filtered off. The filtrate was evaporated to an oil which was dissolved in 2 N hydrochloric acid and extracted with ether. The acid aqueous layer was basified with sodium hydroxide and extracted with ether. The combined ether layers containing the acid soluble material were dried, evaporated and the product distilled to yield the hexahydro compound as a colourless oil (8.48 g.), B.P. (0.2 mm.) 74–6° C. The product was obtained as its hydrochloride (M.P. 154–6° C.) and could be recrystallised from butan-2-one/ether. (Found: C, 68.7; H, 7.75; N, 6.6; Cl, 16.9. $C_{12}H_{15}N \cdot HCl$ requires C, 68.75; H, 7.7; N, 6.7; Cl, 16.9%.)

This compound showed analgesia in mice at a subcutaneous dose of 50 m.p.k.

EXAMPLE XI 1,2,3,3a,8,8a-hexahydro-1,3a-dimethylindeno-
[2,1-b]pyrrole

The free base of Example X (3.45 g.) was hydrogenated at an initial pressure of 40 p.s.i. in the presence of ethanol (100 ml.) 40% aqueous formaldehyde (2.8 ml.) and 10% palladium charcoal (1.0 g.). The theoretical quantity of hydrogen was absorbed in 12 minutes. The mixture was filtered and the solvent removed leaving an oil. Distillation afforded the title product as an oil (3.88 g.), B.P. (0.15 mm.) 70–72°. (Found: C, 83.3; H, 9.2; N, 7.3. $C_{13}H_{17}N$ requires C, 83.4; H, 9.15; N, 7.5%.) The oil (1.7 g.) was heated under reflux for 16 hours with methyl iodide (10.0 ml.) in propan-2-one (50 ml.), evaporated and the residue recrystallised from iso-propyl alcohol to give the methiodide of the title compound (1.75 g.), M.P. 177–178.5° C. (Found: C, 51.5; H, 5.9; N, 4.4. $C_{14}H_{20}NI$ requires C, 51.1; H, 6.1; N, 4.3%.)

This compound showed anti-inflammatory activity in rats as an oral dose of 50 m.p.k.

EXAMPLE XII 3a,8a-dihydro-5-methoxy-3a-methylindeno[2,1-b]
pyrrole-2,8-(1H,3H)-dione (a) 3,5-dicyano - 4 - (m-methoxyphenyl)-4-methyl-glutarimide (113.2 g.) was heated under reflux with stirring for 90 hours in concentrated hydrochloric acid (1.5 l.). The mixture was cooled and extracted with ether (2 l.), the ether fraction was washed with water, which was discarded, and then 2 N sodium hydroxide solution (600 ml.). The alkaline fraction was acidified with concentrated hydrochloric acid and extracted into ether. After drying, removal of the ether afforded 3-(m-methoxyphenyl)- and 3-(m-hydroxyphenyl) - 3 - methyl-glutaric acid (77.0 g.). The mixture of products was dissolved in propan-2-one (1.8 l.) and anhydrous potassium carbonate (75 g.) was added. Dimethyl sulphate (104 ml.) was added slowly and the mixture refluxed for 18 hours. The solid material was filtered off, the filtrate evaporated to an oil, suspended in water and made alkaline with concentrated ammonia solution and extracted with ether. Removal of the solvent and distillation of the residue afforded dimethyl 3 - (m-methoxy-phenyl)-3-methylglutarate (50.0 g.), B.P. (0.1 mm.) 140–143° C. as a colourless oil.

This ester (50 g.) in ethanol (300 ml.) and water (150 ml.) containing potassium hydroxide pellets (44.0 g.) was heated under reflux for 3 hours. The ethanol was distilled from the mixture and the mixture extracted with ether. The aqueous layer was acidified with concentrated hydrochloric acid and extracted with ethyl acetate. After drying, evaporation of the ethyl acetate afforded an orange solid (42.4 g.). The solid was recrystallised from hot water to give the glutaric acid (36.2 g.), M.P. 127–129° C.

(b) Methyl 6 - methoxy-1-methyl-3-oxo-indan-1-ylacetate was prepared as a viscous oil by the method of Example I(a) by reacting together 3-(m-methoxyphenyl)-3-methylglutaric acid (35.0 g.) and polyphosphoric acid (350 g.). The product (28.6 g.) was converted to its methyl ester yielding 14.1 g. of product, B.P. (0.1 mm.) 142–144° C. (Found: C, 67.6; H, 6.4. $C_{14}H_{16}O_4$ requires C, 67.7; H, 6.5%.)

The pure acid was prepared from this ester by hydrolysis with 2 N hydrochloric acid. Recrystallisation from propan-2-ol gave analytically pure 6-methoxy-1-methyl-indan-1-ylacetic acid, M.P. 105–106° C. (Found: C, 66.4; H, 5.8. $C_{13}H_{14}O_4$ requires C, 66.65; H, 6.0%.)

(c) Methyl 2-hydroxyimino - 6 - methoxy-1-methyl-3-oxo-indan-1-ylacetate was prepared according to the method of Example I(b) using the following quantities of reactants: methyl 6-methoxy-1-methyl-3-oxo-indan-1-ylacetate (12.1 g.), anhydrous ether (150 ml.) and n-pentyl nitrite (9.4 g.). A crystalline product (12.2 g.) was obtained which could be recrystallised from propan-2-ol and had M.P. 189–191° C. (Found: C, 60.4; H, 5.4; N, 4.9. $C_{14}H_{15}NO_5$ requires C, 60.6; H, 5.45; N, 5.05%.)

(d) A mixture of methyl 2-hydroxyimino-6-methoxy-1-methyl-3-oxo-indan-1-ylacetate (2.77 g.) 10% palladium on charcoal (0.5 g.) and glacial acetic acid (50 ml.), was hydrogenated according to the method of Example I(c). After two recrystallisations from propan-2-ol the product (1.23 g.) was obtained as a white solid, M.P. 180–182° C. (Found: C, 67.2; H, 5.75; N, 5.8. $C_{13}H_{13}NO_3$ requires C, 67.5; H, 5.8; N, 6.1%.)

This compound is useful as an intermediate in the preparation of active compounds as shown in the next example.

EXAMPLE XIII 1,2,3,3a,8,8a-hexahydro-5-methoxy-3a-methylindeno-
[2,1-b]pyrrolyl-8-ol Using the method of Example II, 6.0 g. of the dione of Example XII(d) gave 4.23 g. of colourless rhombs, recrystallisable from propan-2-ol, M.P. 135–137° C. The hydrochloride had M.P. 204–5° C. (Found: C, 61.0; H, 7.0; N, 5.3. $C_{13}H_{17}NO_2 \cdot HCl$ requires C, 61.25; H, 6.7; N, 5.5%.)

This compound showed analgesia in mice at a subcutaneous dose of 50 m.p.k.

EXAMPLE XIV 3,3a,8,8a-tetrahydro-5-methoxy-3a-methylindeno-
[2,1-b]pyrrole-2(1H)-one The dione of Example XII(d) (13.55 g.) was hydrogenated in glacial acetic acid (150 ml.) containing 10% palladium charcoal (4.0 g.) according to Example IX. After two recrystallisations from propan-2-ol the product (8.1 g.) was obtained as colourless rhombs, M.P. 201–2° C. (Found: C, 72.1; H, 6.9; N, 6.6. $C_{13}H_{15}NO_2$ requires C, 71.9; H, 7.0; N, 6.45%.)

This compound is useful as an intermediate for the preparation of other compounds of the invention.

EXAMPLE XV 1,2,3,3a,8,8a-hexahydro-5-methoxy-3a-methylindeno-
[2,1-b]pyrrole

The product obtained in Example XIV (6.8 g.) was reduced with aluminium lithium hydride (5.5 g.) according to the method of Example X. Distillation of the product afforded 4.27 g. of the title compound, B.P. (0.4 mm.) 111–13° C.

The fumarate had M.P. 199–200° C. (Found: C, 63.9; H, 6.6; N, 4.4. $C_{13}H_{17}NO \cdot C_4H_4O_4$ requires C, 63.8; H, 6.8; N, 4.7%.)

This compound is useful as an intermediate for the preparation of other compounds of the invention.

EXAMPLE XVI 1,2,3,3a,8,8a-hexahydro-5-hydroxy-3a-methyl-
indeno[2,1-b]pyrrole The free base of Example XV (1.4 g.) was heated under reflux with 50% hydrobromic acid (20 ml.) for 4 hours. Evaporation of the acid under reduced pressure afforded an orange oil which after two recrystallisations from propan-2-ol/ether gave 1.5 g. of the hydrobromide of the title compound as colourless rhombs, M.P. 220–222° C. (Found: C, 53.45; H, 6.05; N, 5.1. $C_{12}H_{15}NO \cdot HBr$ requires C, 53.3; H, 6.0; N, 5.2%.)

This compound is useful as an intermediate for the preparation of other compounds of the invention.

EXAMPLE XVII 1,2,3,3a,8,8a-hexahydro-5-methoxy-1,3a-dimethyl-
indeno[2,1-b]pyrrole This compound was prepared by the method of Example XI using 1,2,3,3a,8,8a-hexahydro-5-methoxy-3a-methylindeno[2,1-b]pyrrole (3 g.), ethyl alcohol (100 ml.), 40% aqueous formaldehyde (1.94 ml.) and 10% palladium on charcoal (0.7 g.). After work up, the free base (1.0 g.) was treated with fumaric acid in propan-2-one/ether yielding the fumarate (0.95 g.), M.P. 119–121° C. (Found: C, 65.0; H, 7.0; N, 4.4. $C_{14}H_{19}NO \cdot C_4H_4O_4$ requires C, 64.85; H, 6.95; N, 4.2%.)

This compound is useful as an intermediate for the preparation of active compounds as shown in the next example.

EXAMPLE XVIII 1,2,3,3a,8,8a-hexahydro-5-hydroxy-1,3a-dimethyl-indeno[2,1-b]pyrrole The free base of Example XVII (1.8 g.) was heated under reflux in 50% hydrobromic acid (25 ml.) for 3 hours. The reaction mixture was cooled, made basic with 2 N sodium carbonate solution and extracted with ether.

(b) The crude product from part (a) in dry tetrahydrofuran (50 ml.) was added to a stirred suspension of aluminium lithium hydride (3.5 g.) in dry tetrahydrofuran (100 ml.). The mixture was heated under reflux for 3 hours then decomposed by the successive addition of water (4 ml.), 2 N sodium hydroxide (8 ml.) and water (4 ml.). The inorganic material was filtered off and the solvent removed yielding an oil which was converted to its oxalate and recrystallised from ethanol/ether yielding 2.97 g. of the title compound, M.P. 182–184° C. (Found: C, 69.4; H, 6.9; N, 3.5. $C_{21}H_{25}NO \cdot C_2H_2O_4$ requires C, 69.5; H, 6.85; N, 3.5%.)

This compound showed analgesia in mice at a subcutaneous dose of 50 m.p.k.

By following the procedure outlined above, the following acylating agents give the products indicated:

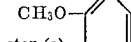

| Acylating agent | R² group (step a) | R² group (step b) |
|---|---|---|
| Propionyl chloride | —CO·CH₂·CH₃ | —(CH₂)₂·CH₃ |
| Valeryl chloride | —CO(CH₂)₃·CH₃ | —(CH₂)₄·CH₃ |
| Benzoyl chloride | —CO—⟨phenyl⟩ | —CH₂—⟨phenyl⟩ |
| p-Toluyl chloride | —CO—⟨phenyl⟩—CH₃ | —CH₂—⟨phenyl⟩—CH₃ |
| p-Methoxybenzoyl chloride | —CO—⟨phenyl⟩—OCH₃ | —CH₂—⟨phenyl⟩—OCH₃ |
| p-Tolylacetyl chloride | —CO·CH₂—⟨phenyl⟩—CH₃ | —(CH₂)₂—⟨phenyl⟩—CH₃ |
| Cyclohexane carbonyl chloride | —CO—⟨cyclohexyl⟩ | —CH₂—⟨cyclohexyl⟩ |
| Cyclopropane carbonyl chloride | —CO—⟨cyclopropyl⟩ | —CH₂—⟨cyclopropyl⟩ |
| Cyclohexylbutyryl chloride | —CO·(CH₂)₃—⟨cyclohexyl⟩ | —(CH₂)₄—⟨cyclohexyl⟩ |

The organic extracts were dried and evaporated affording the title compound as a white solid which was recrystallised from light petroleum (B.P. 100–120° C.) as colourless needles (1.03 g.), M.P. 120–122° C. (Found: C, 76.5; H, 8.6; N, 6.8. $C_{13}H_{17}NO$ requires C, 76.8; H, 8.4; N, 6.9%.)

This compound showed analgesia in mice at a subcutaneous dose of 50 m.p.k.

EXAMPLE XIX 1,2,3,3a,8,8a-hexahydro-5-methoxy-3a-methyl-1-phenylethylindeno[2,1-b]pyrrole (a) 1,2,3,3a,8,8a-hexahydro-5-methoxy-3a-methyl-1-phenacetylindeno[2,1-b]pyrrole was prepared by treating the free base of Example XV (2.83 g.) in chloroform (20 ml.) with triethylamine (2.1 ml.) and adding dropwise to a stirred solution of phenylacetylchloride (2.16 g.) in chloroform (7 ml.) below 30° C. The mixture was stirred at room temperature for 3 hours and then washed successively with water, 2 N hydrochloric acid and 2 N sodium carbonate. Drying and evaporation of the solvent gave a quantitative yield of the product which was used crude for the next stage.

EXAMPLE XX 3a,8a-dihydro-indeno[2.1-b]pyrrol-2,8-(1H,3H)-dione

Methyl 2-hydroxyimino-3-oxo-indan-1-ylacetate (21.0 g.) was hydrogenated in a mixture of glacial acetic acid (120 ml.) and 10% palladium on charcoal (2.0 g.) according to the method of Example 1(c). The product (5.57 g.) after recrystallisation from propan-2-ol had M.P. 198–199° C. (Found: C, 70.4; H, 4.85; N, 7.4. $C_{11}H_9NO_2$ requires C, 70.6; H, 4.85; N, 7.4%.)

This compound is useful as an intermediate for the preparation of other compounds of the invention as shown in the next example.

EXAMPLE XXI 1,2,3,3a,8,8a-hexahydroindeno[2,1-b]pyrrolyl-8-ol

The product of Example XX (5.37 g.) was reduced as described in Example II and the free base obtained as an oil which was converted to its hydrochloride in a mixture of ethereal hydrogen chloride and propan-2-ol. The hydrochloride (2.52 g.) was recrystallised from propan-2-ol and had M.P. 218–220° C. (Found: C, 62.5; H, 6.7; N, 6.5. $C_{11}H_{13}NO \cdot HCl$ requires C, 62.7; H, 6.7; N, 6.6%.)

This compound showed analgesia in mice at a subcutaneous dose of 50 m.p.k. and anti-inflammatory activity in rats at an oral dose of 100 m.p.k.

EXAMPLE XXII 1-(3-dimethylaminopropyl)-3a-methyl-3,3a,8,8a-tetrahydro-indeno[2,1-b]pyrrol-2(1H)-one A solution of 3a-methyl-3,3a,8,8a-tetrahydro-indeno[2,1-b]pyrrol-2(1H)-one (3.6 g.) in dry tetrahydrofuran (100 ml.) was added to a stirred suspension of sodium hydride (0.96 g. of a 50% dispersion in oil) in dry dimethylformamide (100 ml.) under nitrogen. After stirring the mixture at 40° C. for 1 hour, a solution of 3-dimethylaminopropyl chloride (2.5 g.) in dry dimethylformamide (5 ml.) was added dropwise and the resulting mixture heated for 3 hours at 80° C. After a further 16 hours at room temperature, the excess of dimethylformamide was removed in vacuo, water (50 ml.) added to the residue and then extracted with benzene. The organic extract was washed with 2 N sulphuric acid, the acid extract basified and the precipitated oil re-extracted with benzene. Exaporation of the dried extract gave an oily residue which was converted into the hydrochloride of the title compound (4.33 g.), M.P. 184–185° C., by treatment with a solution of hydrogen chloride in propan-2-one. (Found: C, 6.1; H, 8.2; N, 9.0 $C_{17}H_{24}N_2O \cdot HCl$ requires C, 66.3; H, 8.2; N, 9.1%.)

This compound is useful as an intermediate for the preparation of other compounds of the invention.

EXAMPLE XXIII 3a-methyl-1-phenylacetyl-3,3a,8,8a-tetrahydro-indeno[2,1-b]pyrrol-2(1H)-one 3a - methyl - 3,3a,8,8a-tetrahydro-indeno[2,1-b]pyrrol-2(1H)-one was converted into its sodio derivative according to the method of Example XXII and treated with phenylacetyl chloride to give the title compound.

This compound is useful as an intermediate for the preparation of other compounds of the invention.

EXAMPLE XXIV 3,3a,8,8a-tetrahydro-3a-methyl-1-(prop-2-ynyl)indeno-pyrrol-2(1H)-one (a) Sodium (1.38 g.) was added portionwise to liquid ammonia (100 ml.) containing a trace of ferric nitrate. To the resulting solution was added during one hour 3,3a,8,8a - tetrahydro - 3a - methylindeno[2,1-b]pyrrol-2(1H)-one (10.1 g.). The excess of ammonia was allowed to evaporate overnight and the residue of the sodium salt of the starting lactam was used for the next stage.

(b) A solution of the above sodium salt in dry dimethylformamide (100 ml.) was treated dropwise with 1-bromoprop-2-yne (4.5 ml.) and the resulting mixture stirred for 20 hours at room temperature. The excess of dimethylformamide was evaporated in vacuo, the residue treated with water (200 ml.) and then extracted with benzene (2× 100 ml.). The dried benzene solution was evaporated and the residual solid recrystallised three times from benzene to give 3.41 g. of the title compound, M.P. 117–119° C. (Found: C, 79.7; H, 6.9; N, 6.2 $C_{15}H_{15}NO$ requires C, 80.0; H, 6.7; N, 6.2%.)

This compound is useful as an intermediate for the preparation of other compounds of the invention.

EXAMPLE XXV 1,2,3,3a,8,8a-hexahydro-8-methoxy-1,3a-dimethylindeno[2,1-b]pyrrole A solution of 1,2,3,3a,8,8a, - hexahydro - 1,3a-dimethylindeno[2,1-b]pyrrolyl-8-ol in dry dimethylformamide was treated with a 50% suspension of sodium hydride in oil followed by methyl iodide and worked up in the usual manner to give the title compound.

By following the above procedure, the following alkylating and acylating agents gave the products indicated:

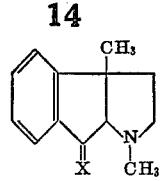

| Alkylating or acylating agent | X group |
|---|---|
| Butyl bromide | H, O·C₄H₉ |
| Benzyl bromide | H, O·CH₂–C₆H₅ |
| p-Methylbenzyl bromide | H, O·CH₂–C₆H₄–CH₃ |
| 2-phenylethyl bromide | H, O·(CH₂)₂–C₆H₅ |
| Bromo-benzene | H, O–C₆H₅ |
| p-bromo-toluene | H, O–C₆H₄–CH₃ |
| p-bromo-anisole | H, O–C₆H₄–OCH₃ |
| Butyryl chloride | H, O·CO·(CH₂)₂CH₃ |
| Acetyl chloride | H, O·CO·CH₃ |

EXAMPLE XXVI 5-acetoxy-1,2,3,3a,8,8a-hexahydro-1,3a-dimethyl-indeno[2,1-b]pyrrole A solution of 1,2,3,3a,8,8a-hexahydro-5-hydroxy-1,3a-dimethylindeno-[2,1-b]pyrrole in dry dimethylformamide was treated with a 50% suspension of sodium hydride in oil followed by acetyl chloride and then worked up in the usual manner to give the title compound.

In the same way the following acylating agents gave the products indicated:

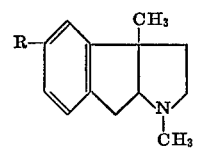

| Alkylating or acylating agent | R group |
|---|---|
| Butyryl chloride | —O·CO·(CH₂)₂CH₃ |
| Butyl bromide | —O·C₄H₉ |
| Benzyl bromide | —O·CH₂–C₆H₅ |
| p-Methylbenzyl bromide | —O·CH₂–C₆H₄–CH₃ |
| 2-phenylethyl bromide | —O·(CH₂)₂–C₆H₅ |

EXAMPLE XXVII

| | Mg. |
|---|---|
| 1,2,3,3a,8,8a - hexahydro - 3a - methylindeno[2,1-b]pyrrolyl-8-ol | 60 |
| Lactose | 120 |
| Magnesium stearate | 5 |

Capsules of the above were made up by thoroughly mixing together batches of the above ingredients and filling hard gelatin capsules (185 mg.) with the mixture.

EXAMPLE XXVIII

| | Mg. |
|---|---|
| 1,2,3,3a,8,8a - hexahydro - 3a - methylindeno[2,1-b]pyrrolyl-8-ol | 60 |
| Lactose | 100 |
| Avicel | 30 |
| Dried maize starch | 40 |
| Magnesium stearate | 5 |

Tablets of the above composition were made by milling the active ingredients to 40 mesh (British Standard), sieving through a 40 mesh (British Standard) sieve, mixing the milled material with the other components and compressing to form tablets.

What is claimed is:

1. A compound selected from the group consisting of indeno - [2,1-b]pyrroles of formula

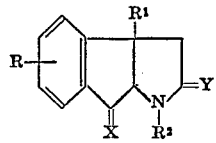

and the pharmaceutically acceptable acid addition and quaternary ammonium salts thereof, wherein R is selected from the group consisting of hydrogen, lower alkoxy and hydroxyl radicals; $R^1$ is selected from the group consisting of hydrogen and lower alkyl radicals; $R^2$ is selected from the group consisting of hydrogen, lower alkyl, lower alkenyl, lower alkynyl, cyclohexyl, cyclopropyl, benzyl, phenethyl, methylbenzyl, methylphenethyl, methoxybenzyl, cyclohexylmethyl, cyclopropylmethyl, cyclohexylbutyl, dimethylaminopropyl, diethylaminopropyl, dimethylaminoethyl, diethylaminoethyl, acetyl, benzoyl, phenacetyl, propionyl, valeryl, methylbenzoyl, methoxybenzoyl, methylphenacetyl, cyclohexylcarbonyl cyclopropylcarbonyl, and cyclohexybutyryl; Y is selected from the group consisting of two hydrogen atoms and an oxygen atom; and X is selected from the group consisting of (i) two hydrogen atoms, (ii) an oxygen atom, and (iii) one hydrogen atom and one radical chosen from the group consisting of hydroxyl and acyloxy radicals of lower fatty acids.

2. A compound according to claim 1 which is 1,2,3,3a,8,8a - hexahydro - 3a - methylindeno[2,1-b]pyrrolyl-8-ol.

3. A compound according to claim 1 which is 1,2,3,3a,8,8a - hexahydro - 1,3a - dimethylindeno[2,1-b]pyrrole.

4. A compound according to claim 1 which is 1,2,3,3a,8,8a - hexahydro - 5 - hydroxy - 1,3a-dimethylindeno[2,1-b]pyrrole.

5. A compound according to claim 1 which is 1-acetyl-1,2,3,3a,8,8a - hexahydro - 3a - methylindeno[2,1-]pyrrolyl-8-ol.

6. A compound according to claim 1 which is 1-allyl-1,2,3,3a,8,8a - hexahydro-3a-methylindeno[2,1-b]pyrrolyl-8-ol.

7. A compound according to claim 1 which is 1,2,3,3a,8,8a-hexahydro-3a-methylindeno[2,1-b]pyrrole.

8. A compound according to claim 1 which is 1,2,3,3a,8,8a - hexahydro - indeno[2,1-b]pyrrolyl-8-ol.

9. A compound according to claim 1 which is 1,2,3,3a,8,8a - hexahydro - 5 - methoxy - 3a - methylindeno[2,1-b]pyrrolyl-8-ol.

10. A compound according to claim 1 which is 1,2,3,3a-8,8a - hexahydro - 1,3a - dimethylindeno[2,1-b]pyrrolyl-8-ol.

References Cited

UNITED STATES PATENTS 3,453,287   7/1969   Campaigne et al. __ 260—326.5 B

ALEX MAZEL, Primary Examiner

J. A. NARCAVAGE, Assistant Examiner

U.S. Cl. X.R.

260—326.3; 424—274